(12) United States Patent
Nogami et al.

(10) Patent No.: US 8,806,370 B2
(45) Date of Patent: Aug. 12, 2014

(54) SUBSTRATE PROCESSING APPARATUS

(75) Inventors: Shigeki Nogami, Toyama (JP); Mitsuru Funakura, Toyama (JP); Isao Teranishi, Toyama (JP); Tsukasa Yashima, Imizu (JP); Hiroshi Ekko, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 779 days.

(21) Appl. No.: 11/905,582

(22) Filed: Oct. 2, 2007

(65) Prior Publication Data

US 2008/0178119 A1 Jul. 24, 2008

(30) Foreign Application Priority Data

Oct. 4, 2006 (JP) .................................. 2006-272746
Aug. 7, 2007 (JP) .................................. 2007-205108

(51) Int. Cl.
*G06F 3/048* (2013.01)

(52) U.S. Cl.
USPC .......................................... 715/810; 700/121

(58) Field of Classification Search
USPC ....................... 715/778, 801; 700/95, 97, 121
See application file for complete search history.

(56) References Cited

U.S. PATENT DOCUMENTS

| | | | | |
|---|---|---|---|---|
| 4,926,310 A | * | 5/1990 | Inuzuka et al. .................. | 700/81 |
| 5,283,943 A | * | 2/1994 | Aguayo et al. .................. | 29/701 |
| 5,566,076 A | * | 10/1996 | Kuroda .......................... | 700/213 |
| 5,591,299 A | * | 1/1997 | Seaton et al. .................. | 700/121 |
| 5,740,053 A | * | 4/1998 | Iwama .......................... | 700/121 |
| 6,336,053 B1 | * | 1/2002 | Beatty .......................... | 700/108 |
| 6,415,193 B1 | * | 7/2002 | Betawar et al. ................. | 700/97 |
| 6,618,851 B1 | * | 9/2003 | Zundel et al. ................. | 717/103 |
| 6,625,513 B1 | | 9/2003 | Lymberopoulos et al. | |
| 6,629,003 B1 | * | 9/2003 | Frizzell et al. .................. | 700/97 |
| 6,895,297 B2 | * | 5/2005 | Shiba et al. .................... | 700/172 |
| 6,952,625 B2 | * | 10/2005 | Uetake et al. ................. | 700/116 |

(Continued)

FOREIGN PATENT DOCUMENTS

| | | |
|---|---|---|
| JP | A-08-103739 | 4/1996 |
| JP | A-11-095878 | 4/1999 |

(Continued)

OTHER PUBLICATIONS

Sep. 1, 2010 Office Action issued in Korean Patent Application No. 10-2007-0098631 (with translation).

(Continued)

*Primary Examiner* — Phenuel Salomon
(74) *Attorney, Agent, or Firm* — Oliff PLC

(57) ABSTRACT

To provide a substrate processing apparatus which can prevent a reduction in quality of a product, and damage to the apparatus. In a control program which operates on a substrate processing apparatus, a recipe storage portion and a parameter storage portion configure a data storage device which stores data relating to a control. On a user who has an authority being authenticated by an authentication process, the user carries out a data editing operation via an editing screen. A setting portion receives, via a UI device, operations for editing data stored by the data storage device. A timing portion measures a time between the operations received by the setting portion, and transmits the time to an operation control portion. In the event that the time measured by the timing portion has exceeded a prescribed time, the operation control portion prohibits the reception of the operations for editing the data.

8 Claims, 7 Drawing Sheets

(56) References Cited

U.S. PATENT DOCUMENTS

| | | | |
|---|---|---|---|
| 6,970,763 B2* | 11/2005 | Kato | 700/180 |
| 7,036,212 B2* | 5/2006 | Kato et al. | 29/740 |
| 7,065,714 B1* | 6/2006 | Theel et al. | 715/781 |
| 7,167,768 B2* | 1/2007 | Kato et al. | 700/121 |
| 7,343,583 B2* | 3/2008 | Keck et al. | 716/51 |
| 2002/0067370 A1* | 6/2002 | Forney et al. | 345/742 |
| 2002/0118228 A1* | 8/2002 | Bergo et al. | 345/765 |
| 2003/0014145 A1* | 1/2003 | Reiss et al. | 700/121 |
| 2003/0098798 A1* | 5/2003 | Kato | 340/679 |
| 2003/0137535 A1* | 7/2003 | Heo | 345/741 |
| 2003/0222905 A1* | 12/2003 | Wierenga et al. | 345/744 |
| 2003/0225472 A1* | 12/2003 | Kato | 700/117 |
| 2005/0217581 A1* | 10/2005 | Higashi et al. | 118/719 |
| 2006/0162660 A1* | 7/2006 | Shimizu | 118/719 |
| 2006/0184264 A1* | 8/2006 | Willis et al. | 700/108 |
| 2007/0038324 A1* | 2/2007 | Takizawa et al. | 700/105 |
| 2007/0212846 A1* | 9/2007 | Yokouchi et al. | 438/402 |

FOREIGN PATENT DOCUMENTS

| | | |
|---|---|---|
| JP | A-11-195573 | 7/1999 |
| JP | A-2003-273577 | 9/2003 |
| JP | A-2005-056301 | 3/2005 |
| JP | A-2006-060157 | 3/2006 |
| JP | A-2007-109967 | 4/2007 |
| KR | 10-0298700 B1 | 11/2001 |
| KR | A-2002-0013811 | 2/2002 |
| KR | A-2002-0035044 | 5/2002 |
| KR | A-2002-0065275 | 8/2002 |

OTHER PUBLICATIONS

Korean Office Action issued in KR Application No. 10-2007-0098631 dated Feb. 1, 2012 (w/ Translation).

Korean Office Action issued in KR Application No. 10-2007-0098631 dated Dec. 8, 2010 (w/ Translation).

Jun. 19, 2012 Office Action issued in Japanese Patent Application No. 2007-205108 (with translation).

Jun. 12, 2012 Office Action issued in Korean Patent Application No. 10-2012-0041363 w/translation.

Feb. 25, 2013 Office Action issued in Korean Patent Application 10-2012-0041363 (w/translation).

* cited by examiner

FIG. 2A

RECIPE EDITING SCREEN

| STEP No. | 1 | 2 | 3 | 4 | 5 | 6 |
|---|---|---|---|---|---|---|
| RF OUTPUT (W) | 0 | 0 | 0 | 0 | 0 | 0 |
| PRESSURE (Pa) | 600 | 600 | 4000 | 4000 | 600 | 0 |
| GAS FLOW(sccm) | 10000 | 10000 | 13000 | 13000 | 10000 | 0 |
| ⋮ | ⋮ | ⋮ | ⋮ | ⋮ | ⋮ | ⋮ |

[REFERENCE] [EDITING] [SAME LEVEL SETTING] [RESET] [MONITOR] [DISPLAY SWITCH] [SAVE AND FINISH] [DESTROY AND FINISH]

FIG. 2B

PARAMETER EDITING SCREEN

| | | | | |
|---|---|---|---|---|
| PARAMETER A: | ACTIVATED | DEACTIVATED | DEACTIVATED | DEACTIVATED |
| PARAMETER B: | ACTIVATED | ACTIVATED | DEACTIVATED | DEACTIVATED |
| PARAMETER C: | ACTIVATED | | | |
| PARAMETER D: | DEACTIVATED | | | |

[RESET] [MONITOR] [SAVE AND FINISH] [DESTROY AND FINISH]

SUBSTRATE PROCESSING APPARATUS 10

SUBSTRATE PROCESSING APPARATUS

BACKGROUND OF THE INVENTION

1. Technical Field

The present invention relates to a substrate processing apparatus which processes a semiconductor substrate, a glass substrate, or the like.

2. Related Art

This kind of substrate processing apparatus is controlled based on an operation recipe, which includes a plurality of processes and the like, under prescribed control parameters and apparatus parameters. These kinds of operation recipe and apparatus parameters are edited, via a prescribed editing screen, by a user who has an editing authority.

JP-A-11-195573 discloses a semiconductor processing apparatus which, including a plurality of processing rooms, feeds a wafer, which is a subject of a processing, through the plurality of processing rooms, and executes a plurality of differing processes on the wafer, the apparatus displaying an operation recipe compilation screen, for compiling an operation recipe which includes the plurality of processes and the like, on a display portion.

However, in a case in which the user who has the editing authority leaves the apparatus during an editing of the operation recipe or the like, due to circumstances such as dealing with a problem with a high degree of urgency, evacuation due to an activation of an emergency bell, or a physical problem, there is a fear that the operation recipe or the like being displayed on the screen will be edited by a user who does not normally have the operating authority (who is not permitted to do the editing). In the event that the apparatus is operated based on a wrongly edited operation recipe or apparatus parameters, various problems, such as the apparatus receiving damage or a quality of a product deteriorating, will occur.

SUMMARY OF THE INVENTION

The invention has an object of providing a substrate processing apparatus which can prevent an inappropriate editing by a user who does not have an editing authority.

In order to achieve the object, a substrate processing apparatus according to the invention, being a substrate processing apparatus which, executing a compiled or edited recipe, processes a substrate, includes: a display device which displays an editing screen for compiling or editing the recipe, and a controller, which controls in such a way that, in the event that a time set in advance elapses without an operation being carried out on the editing screen displayed by the display device, as well as carrying out a logging out process, and a screen switching process from the editing screen to a prescribed screen which differs from the editing screen, it carries out a deleting process on data edited up to the logging out process, from among data relating to the recipe.

Preferably, the controller switches from the editing screen to an initial screen.

Preferably, the controller switches from the editing screen to an authentication screen.

Preferably, designation devices for carrying out a change of an operating authority and a logging in process are included on the initial screen, and the controller, in the event that the change of the operating authority and the logging in process have been carried out via the designation devices, receives a recipe editing operation.

Preferably, the controller, in the event that an identifier and a password of a user input via the authentication screen match an identifier and a password of the user stored in advance, receives the recipe editing operation.

Also, preferably, the controller saves data relating to a recipe partway through editing as a temporary file.

With the substrate processing apparatus according to the invention, as it does not happen that the user who does not have the editing authority carries out an editing of an operation recipe, apparatus parameters or the like, it is possible to prevent a reduction in quality of a product due to an execution of an unauthorized operation recipe, and damage to the apparatus due to an execution of an unauthorized apparatus parameter.

BRIEF DESCRIPTION OF THE DRAWINGS

FIG. 1A shows the menu screen, and FIG. 1B shows the authentication screen;

FIGS. 2A and 2B are views illustrating screens for editing an operation recipe and control parameters stored in the substrate processing apparatus according to the invention, where FIG. 2A illustrates a recipe editing screen, and FIG. 2B illustrates a parameter editing screen;

DESCRIPTION OF THE PREFERRED EMBODIMENT(S)

Firstly, a description will be given of an outline of the invention, with reference to FIGS. 1A and 1B, and FIGS. 2A and 2B.

Figure 1A:
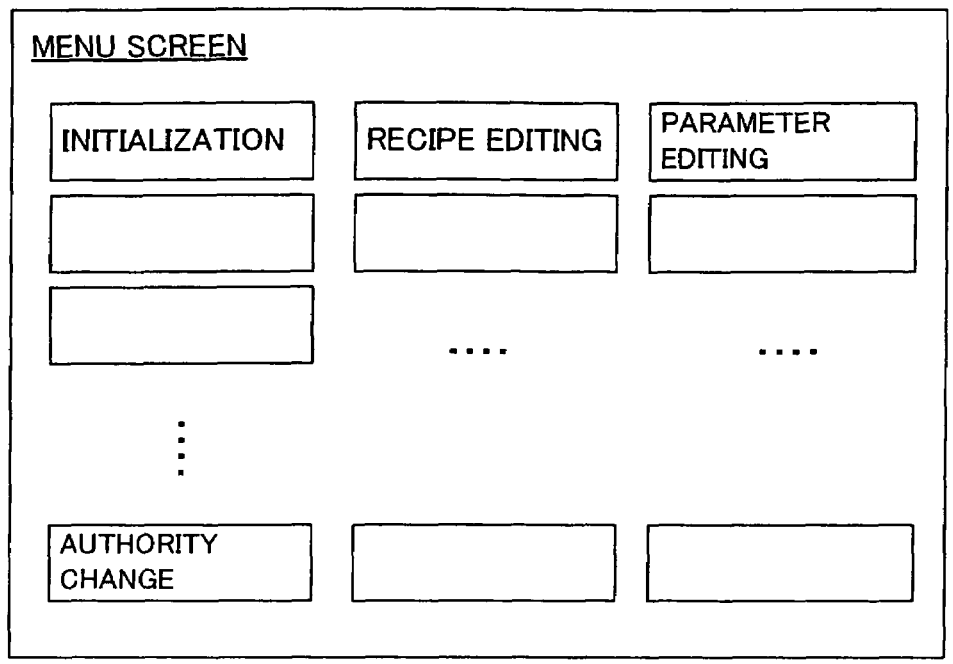
FIGS. 1A and 1B are views showing a menu screen and an authentication screen displayed when carrying out a prescribed process with a substrate processing apparatus according to the invention, where
Figure 1B:
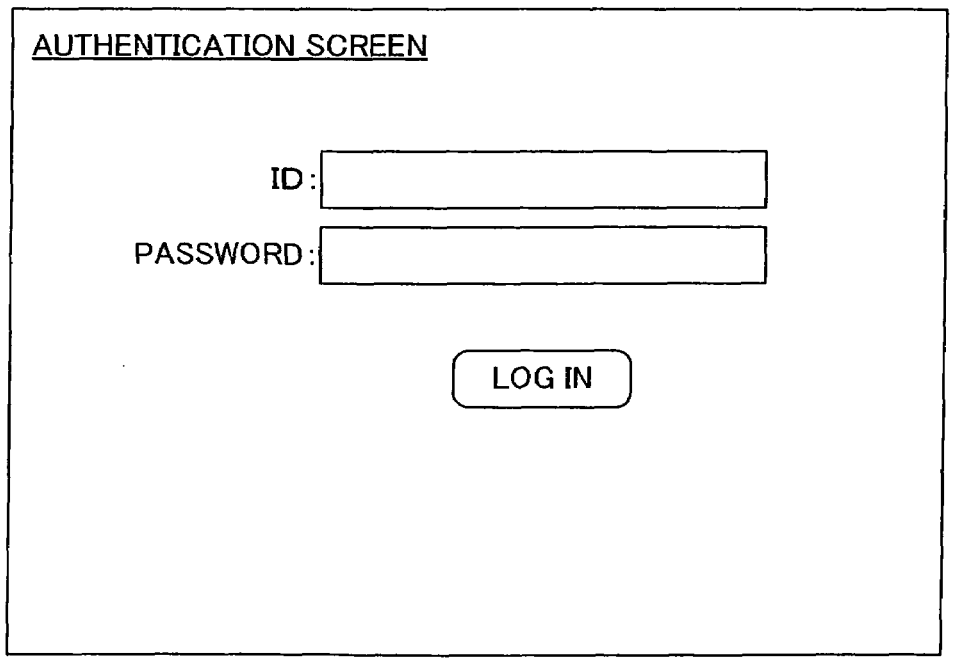

FIGS. 1A and 1B are views showing a menu screen and an authentication screen displayed when carrying out a prescribed process with a substrate processing apparatus according to the invention, where FIG. 1A shows the menu screen, and FIG. 1B shows the authentication screen. FIGS. 2A and 2B are views illustrating screens for editing an operation recipe and apparatus parameters stored in the substrate processing apparatus according to the invention, where FIG. 2A illustrates a recipe editing screen, and FIG. 2B illustrates a parameter editing screen for easily changing a condition of the apparatus, a usable function, and the like, by setting parameter data (the apparatus parameters).

As shown in FIG. 1A, a plurality of buttons, designating processes such as an initializing process, a recipe editing process, a parameter editing process and an authority changing process, are included on the menu screen. A user, when editing the operation recipe or the apparatus parameters, carries out the process by pressing a button corresponding to the desired process on the menu screen.

As shown in FIG. 1B, input portions for inputting a user identifier (ID) and a password corresponding to the ID, as well as a log in button, are included on the authentication screen. On the user pressing a prescribed button on the menu screen, the authentication screen is displayed. On the user inputting the ID and password on the authentication screen, and pressing the log in button, it is determined whether or not the user has an authority to be able to carry out a process selected on the menu screen. In the event that the user has the authority, the user can carry out the selected process (for example, the recipe editing, the parameter editing, or the like).

A flow from the recipe editing to a recipe execution will be described in detail, using FIGS. 1A and 1B.

On the user pressing an authority change button shown in FIG. 1A, the screen is switched to the authentication screen of FIG. 1B, and the user carries out a logging in (the inputting of the user ID and the password). On the logging in process being executed, the screen is switched back to the menu screen of FIG. 1A. A difference between an initial screen (the menu screen) before the logging in and the relevant menu screen is that a function which the user who has carried out the logging in can use is displayed on the relevant menu screen in a different color. On the user pressing a recipe editing button on the screen, the screen is switched to the recipe editing screen. The user carries out an editing operation on the recipe editing screen and, when the editing is finished, presses a save and finish button. On the save and finish button being pressed, the screen returns to the menu screen. Then, the user, displaying a screen which executes a recipe by pressing an unshown recipe execution button, selects and executes the recipe.

Once the user carries out the logging in, the operating authority is held for as long as a logging out process is not carried out. In general, as a user with a low authority level is operating the apparatus, in a case in which a special task such as the recipe editing or a parameter setting change is carried out, it is implemented after a user with a high authority level has logged in again. The user with the high authority level, on finishing this kind of special task, subsequently logs out, the user with the low authority level logs in again, and operates the apparatus.

As illustrated in FIG. 2A, a plurality of steps included in the operation recipe, setting values in these steps, and a plurality of operation buttons, including the save and finish button for saving the setting values, and the like, are included on the recipe editing screen. Along with the user changing contents of the operation recipe by changing the setting values on the recipe editing screen, and pressing the save and finish button, the recipe editing screen switches to the menu screen. In the invention, the changing of the contents of the operation recipe is possible by setting control parameters such as an RF output, a pressure, and a processing gas flow. For example, in the event that a pressure of 600 Pa is made 6,000 Pa or the like, as a processing condition changes, it is a cause of a quality reduction in the substrate. By extension, there is a possibility of it leading to a loss of the substrate. Also, it is also acceptable to arrange in such a way that the switching to the menu screen is implemented by pressing the save and finish button, and pressing a display switch button.

As illustrated in FIG. 2B, a plurality of the apparatus parameters, and the plurality of operation buttons, including the save and finish button for saving settings of the apparatus parameters, and the like, are included on the parameter editing screen. The user changes contents of the apparatus parameters by changing the settings of the parameters on the parameter editing screen, and pressing the save and finish button. In the invention, parameter A is, for example, a button which sets a processing room. Although only one processing room is activated, this is because the embodiment is a vertical apparatus. Although not shown, in the event that it is a single wafer apparatus having a plurality of the processing rooms, it is possible, for example, to set all of them to be activated. Also, in the event that there is a processing room for which maintenance is necessary, by setting that processing room to be deactivated, it is possible to set in such a way as to cause the processing of the substrate to be carried out in remaining processing rooms. For example, in the event that, setting wrongly, it is set as activated, a conveying device will attempt to insert the substrate into the processing room for which maintenance is necessary, as a result of which it is quite conceivable that, as well as the loss of the substrate, damage will be inflicted on parts (the conveying device etc.) configuring the apparatus themselves. Also, there is a fear of creating a situation in which heat treatment is mistakenly carried out in the processing room for which maintenance is necessary, placing an operator in danger.

Parameter B is, for example, a button which carries out a setting of a load port. Regardless of whether it is a case of the vertical apparatus or the single wafer apparatus, settings are carried out sequentially in accordance with a quantity of currently available load ports. For example, in the event that, setting wrongly, it is made deactivated (there is no load port or maintenance is in progress), it becomes impossible to place a cassette in the load port.

Parameter C is, for example, a button which carries out a setting of an $N_2$ gas purge function. This, in the case of the vertical apparatus in the embodiment, puts a transfer room 124 into a clean condition, as will be described hereafter. In the event that this function is not activated, in particular, a natural oxide film is formed on a processed wafer surface, causing a quality reduction in a wafer.

Parameter D is, for example, a setting of whether or not to activate a notch alignment mechanism, that is, whether or not to carry out a notch alignment of the wafers. Although normally, for the sake of a quality increase in the wafer, a positioning (the notch alignment) of the wafers is carried out, depending on process contents, there is a case in which there is no need to carry out the notch alignment. In this case, by carrying out a wafer transfer without carrying out the notch alignment, it is possible to gain throughput.

Although a description has been given heretofore of the apparatus parameters on the editing screen, the heretofore described embodiment being one example, it goes without saying that, not being limited to this, a variety of parameter additions, changes etc. can be carried out. For example, a setting of a load lock room can be added as parameter E.

The substrate processing apparatus according to the invention receives operations for editing data on screens which edit data relating to the functions of the substrate processing apparatus, such as the recipe editing screen and the parameter editing screen. For example, the substrate processing apparatus receives an operation which the user inputs using a keyboard, and an operation which the user carries out using a pointing device such as a mouse, on a prescribed editing screen.

The substrate processing apparatus according to the invention measures a time between an operation received and a next operation and, in the event that the time measured exceeds a prescribed time, prohibits a reception of the operations for editing the data. For example, the substrate processing apparatus, in the event that the prescribed time has elapsed without the operation being received, carries out the logging out process, and displays the initial screen (for example, the menu screen). In this case, the user, unless he or she inputs the ID and the password again, cannot carry out the editing of the operation recipe or the like.

The initial screen (the menu screen) switched to by means of the logging out process is a screen (a default screen) which accommodates a user with a lowest authority. This is in order to ensure that a recipe partway through editing is not used by another user. Also, in the event that the logging out is done partway through the editing, data edited up to the logging out (the parameters etc.) are destroyed. This is because, in the event that another user, without noticing, saves and executes the recipe partway through the editing, with edited data having been saved, a wrong operation recipe is executed, causing a reduction in quality of a product and damage to the apparatus.

The user, pressing the authority change button on the menu screen, on the menu screen after the logging out, and carrying out the logging in again, causes the recipe editing screen to be displayed one more time, and carries out the editing operation.

It is also acceptable that the recipe partway through the editing is returned to a condition before the editing, and edited data information is saved in a temporary file. In this case, as data partway through the editing have been saved in the temporary file, it is possible for another user to execute a recipe which has not been edited. Also, this is effective in a case in which the user who has been carrying out the editing operation before the logging out carries out the editing operation again. For example, in a case in which the user who has done the operation up to partway through the editing has logged in again, an original recipe is updated using the data of the temporary file so, as it is not necessary for the user to re-edit the recipe, it is convenient. Also, it is also acceptable to make it possible to select whether or not the original recipe is updated using the temporary file.

At a time of logging out, with respect to the data partway through the editing, there are various methods of using the edited data, user's needs, and the like. Consequently, in order to provide versatility, it is desirable to arrange in such a way as to be able to select whether the data partway through the editing are deleted or saved in the temporary file.

Also, it is also acceptable that, for example, the substrate processing apparatus, after the prescribed time has elapsed without the operation being received, carries out the logging out process, displays the authentication screen (FIG. 1B), and requests the inputting of the ID and the password of the user. In this case, the user, unless he or she inputs the ID and the password again, cannot carry out the editing of the operation recipe and the like.

For example, it is possible to arrange in such a way that, by the substrate processing apparatus receiving the editing operation only in the case in which the user who has edited partway through has logged in again, the recipe partway through the editing cannot be executed by another user. In this kind of case, a saving of data relating to the recipe edited up to the logging out process is also possible.

It is also possible to return the recipe partway through the editing to the recipe before the editing, separately save the data partway through the editing in a buffer file (the temporary file), and receive an operation from another user. In this case, it is also acceptable to arrange in such a way that the user who has done the operation up to partway through the editing, in the case in which he or she has logged in again, can update the original recipe using the data partway through the editing. Also, it is also acceptable to arrange in such a way as to select whether or not to update the original recipe in the temporary file. In the event that another user has logged in, that user can execute the recipe before the editing (the original recipe).

Consequently, in the event that, during the editing process, the prescribed time elapses without the substrate processing apparatus receiving the operation, as there is a switch from the recipe editing screen to a designated prescribed screen, even when a user with the editing authority is not present, a user with no editing authority is prevented from changing a value on the editing screen. For this reason, a control of the apparatus based on a wrongly edited operation recipe or the like being prevented, the reduction in quality of the product and damage to the apparatus are prevented.

Next, a detailed description will be given of the substrate processing apparatus 10 according to the embodiment of the invention, with reference to FIGS. 3 to 5.

Figure 3:
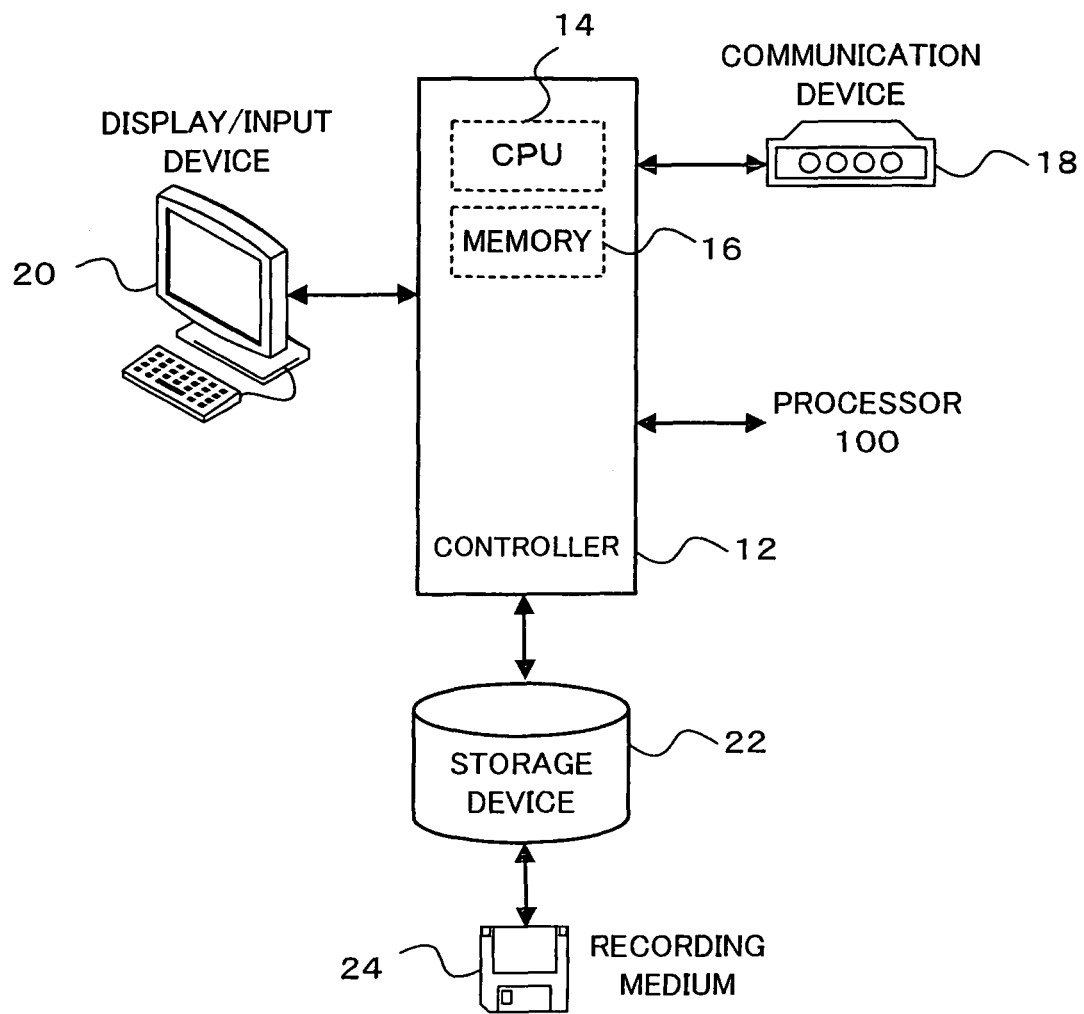
FIG. 3 is a diagram showing a configuration of a substrate processing apparatus 10 according to an embodiment of the invention, centered on a controller 12.

FIG. 3 is a diagram showing a configuration of the substrate processing apparatus 10 according to the embodiment of the invention, centered on a controller 12.

As shown in FIG. 3, the substrate processing apparatus 10 has the controller 12, which includes a CPU 14, a memory 16 and the like, a communication device 18, which carries out a transmission and reception of data with an external computer, or the like, via a network, a storage device 22 such as a hard disc drive, a user interface (UI) device 20, which includes a display device such as a liquid crystal display, along with the keyboard and a pointing device such as the mouse, and a processor 100.

The controller 12 issues instructions for the processing of the substrate to the processor 100. Also, the controller 12 transmits a condition of the processor 100 to an external host device, or the like, via the unshown network.

The processor 100 (a substrate processing apparatus main body), being a vertical apparatus which, for example, carries out an oxidation, as well as a diffusion process and a CVD process, or the like, on the substrate, adjusts a temperature, gas and the like, and carries out a film-forming process, based on an instruction from the controller 12. Specifically, the processor 100 is controlled by the controller 12, based on the stored operation recipe, control parameters, and the like.

In this way, the substrate processing apparatus 10, including, for example, a general-purpose computer in which a control program 40, to be described hereafter, or the like is installed, carries out prescribed processes with the substrate. The substrate processing apparatus 10 according to the embodiment of the invention stores the data relating to the functions such as the operation recipe and apparatus parameters, receives the operations for editing the stored data, measures the time between the received operations and, in the event that the measured time has exceeded the prescribed time, prohibits the reception of the operations for editing the data. It is acceptable both that the substrate processing apparatus 10 receives an operation carried out by the user via the keyboard, and mouse or the like, of the UI device 20, and that it receives an operation, via the communication device 18, which the user has input using the external computer (not shown).

Figure 4:
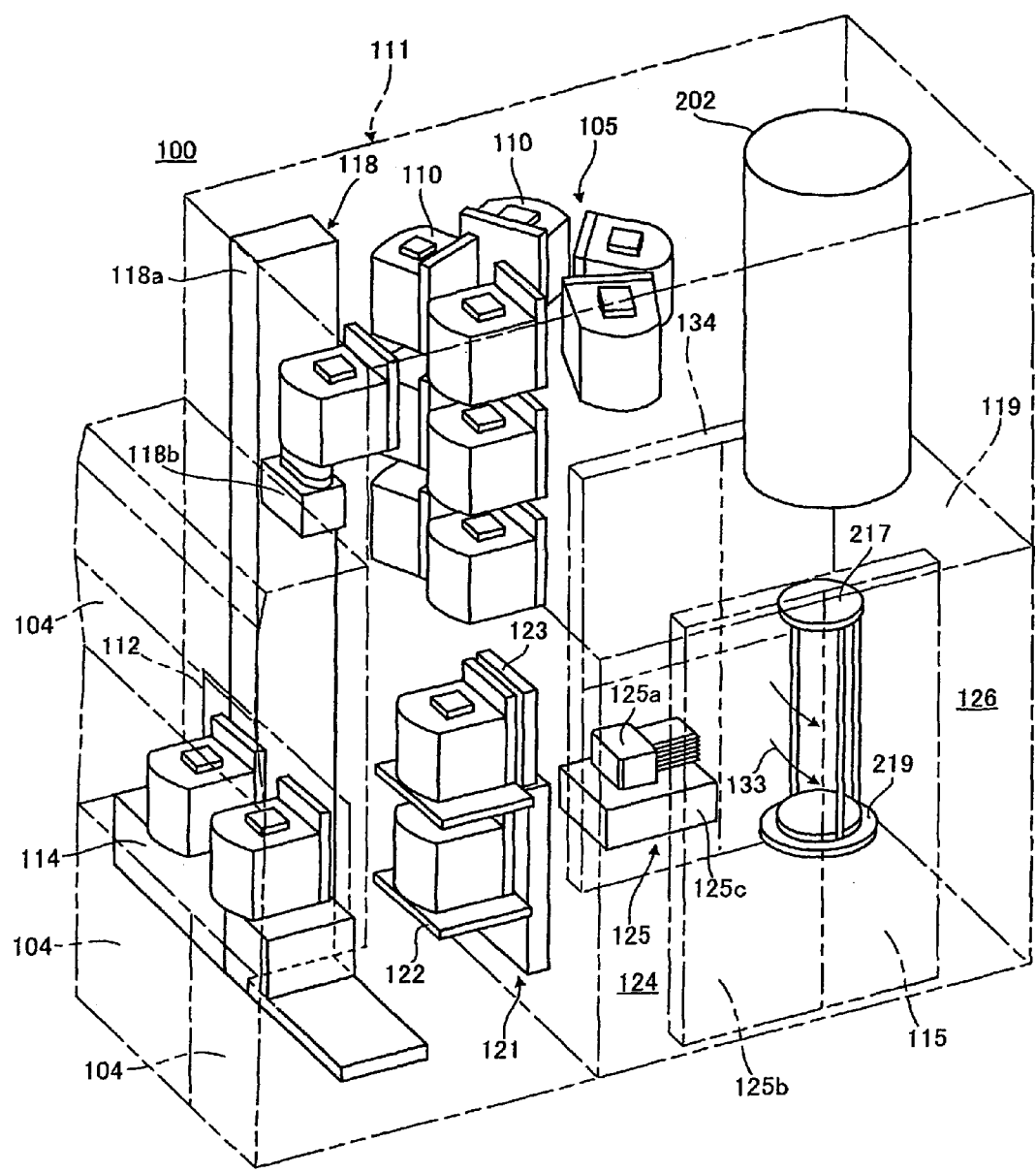
FIG. 4 is a perspective transparent view of a processor 100 applied to the substrate processing apparatus 10 according to the embodiment of the invention.

FIG. 4 is a perspective transparent view of the processor 100 applied to the substrate processing apparatus 10 according to the embodiment of the invention.

Figure 5:
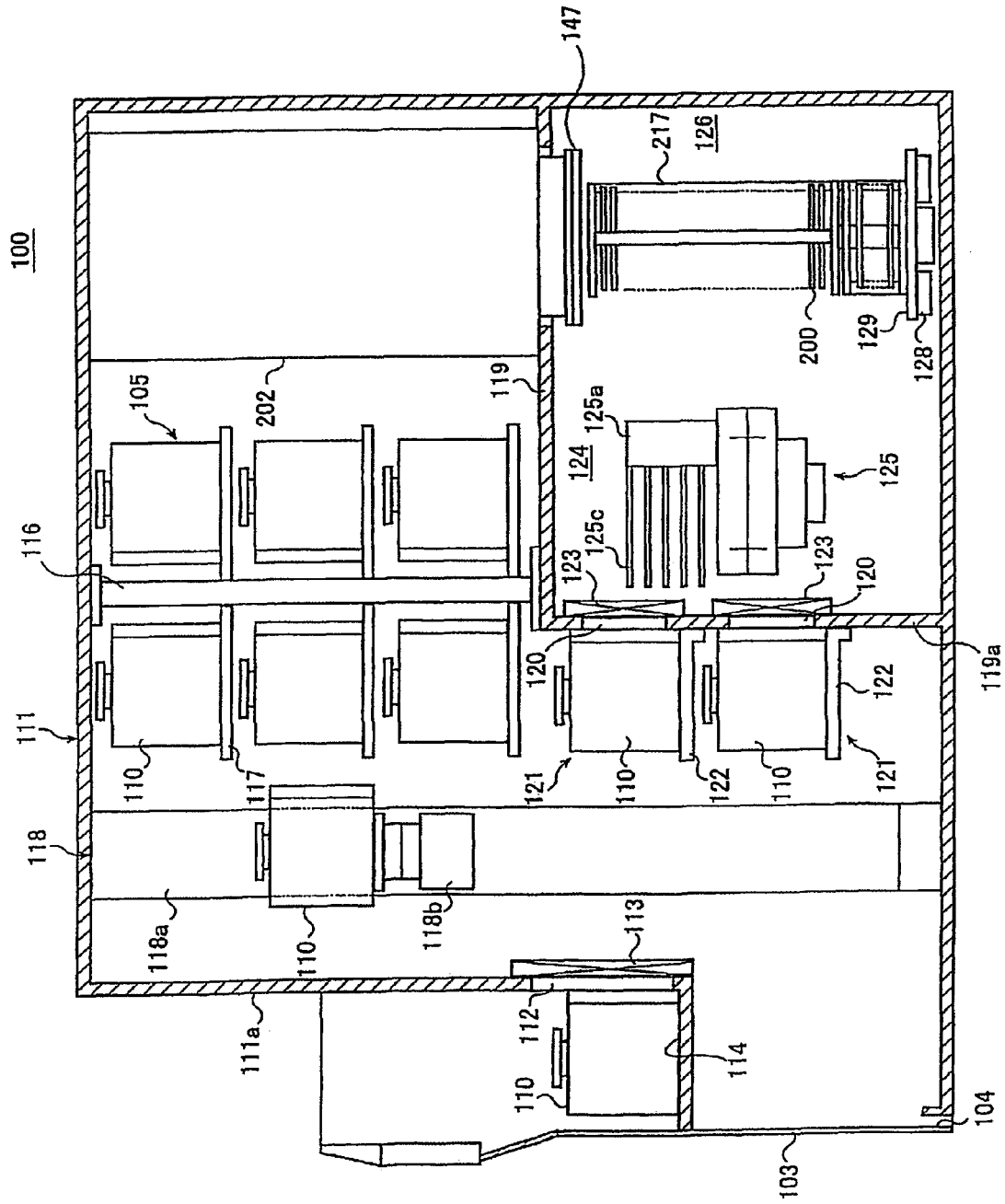
FIG. 5 is a side transparent view of the processor 100 applied to the substrate processing apparatus 10 according to the embodiment of the invention.

FIG. 5 is a side transparent view of the processor 100 shown in FIG. 4.

As shown in FIGS. 4 and 5, the processor 100 includes a cabinet 111. A front maintenance aperture 103 being opened in a front anterior portion of a front wall 111a of the cabinet 111, as an opening provided in such a way as to enable maintenance, front maintenance doors 104 and 104, which open and close the front maintenance aperture 103, are severally attached thereto. Also, the processor 100 includes hoops (substrate receptacles. Hereafter referred to as pods) 110 as wafer carriers which hold wafers (the substrates) made of silicon or the like.

A pod in-out aperture (a substrate receptacle in-out aperture) 112 being opened in the front wall 111a of the cabinet 111 in such a way as to connect an inside and outside of the cabinet 111, the pod in-out aperture 112 is opened and closed by a front shutter (a substrate receptacle in-out aperture opening and closing mechanism) 113. A load port (a substrate receptacle transfer platform) 114 being installed on a front anterior side of the pod in-out aperture 112, the load port 114 is configured in such a way as to be loaded with and position the pods 110. The pods 110 are brought onto the load port 114, and also taken off the load port 114, by an in-process conveyor device (not shown).

Rotating pod shelves (substrate receptacle mounting shelves) 105 being installed in an upper portion in an approximately central portion of an anteroposterior direction inside the cabinet 111, the rotating pod shelves 105 are configured in such a way as to store a plurality of the pods 110. That is, the rotating pod shelves 105 including a support 116, stood vertically, which is intermittently rotated in a horizontal plane, and a plurality of shelf plates (substrate receptacle mounting platforms) 117, supported in a radial pattern by the support 116 in upper, middle and lower positions, the plurality of shelf plates 117 are configured in such a way as to hold a plurality of the pods 110 in a condition in which the pods 110 are mounted one on each of the shelf plates 117.

A pod conveyor device (a substrate receptacle conveyor device) 118 being installed between the load port 114 and the rotating pod shelves 105 inside the cabinet 111, the pod conveyor device 118 is configured of a pod elevator (a substrate receptacle raising and lowering mechanism) 118a capable of rising and descending while holding the pods 110, and a pod conveyor mechanism (a substrate receptacle conveyor mechanism) 118b as a conveyor mechanism. The pod conveyor device 118 is configured in such a way as to convey the pods 110 between the load port 114, the rotating pod shelves 105 and pod openers (substrate receptacle cover opening and closing mechanisms) 121, by means of a continuous action of the pod elevator 118a and the pod conveyor mechanism 118b.

A sub-cabinet 119 is constructed, reaching to a posterior extremity, in a lower portion in the approximately central portion of the anteroposterior direction inside the cabinet 111. A pair of wafer in-out apertures (substrate in-out apertures) 120, for conveying the wafers into and out of an inside of the sub-cabinet 119, are opened in a front wall 119a of the sub-cabinet 119, aligned in two stages, top and bottom, in a vertical direction. A pair of the pod openers 121 and 121 are installed one in each of the top and bottom wafer in-out apertures 120 and 120. The pod openers 121 include mounting platforms 122 and 122, on which the pods 110 are mounted, and cap attachment and removal mechanisms (cover attachment and removal mechanisms) 123 and 123, which attach and remove caps of the pods 110. The pod openers 121 are configured in such a way as to open and close wafer insertion and removal apertures of the pods 110 by removing and attaching the caps of the pods 110, mounted on the mounting platforms 122, by means of the cap attachment and removal mechanisms 123.

The sub-cabinet 119 configures the transfer room 124 fluidically isolated from an installation space of the pod conveyor device 118 and the rotating pod shelves 105. A wafer transfer mechanism (a substrate transfer mechanism) 125 being installed in a front area of the transfer room 124, the wafer transfer mechanism 125 is configured of a wafer transfer device (a substrate transfer device) 125a, capable of rotating or translating the wafers in the horizontal direction, and a wafer transfer device elevator (a substrate transfer device raising and lowering mechanism) 125b for raising and lowering the wafer transfer device 125a. As schematically shown in FIG. 4, the wafer transfer device elevator 125b is installed between a pressure-proof cabinet 111 right side extremity and a right extremity of the transfer room 124 front area of the sub-cabinet 119. These are configured in such a way as to, having tweezers (a substrate holding body) 125c of the wafer transfer device 125a as a wafer mounting portion, load (charge) and unload (discharge) the wafers onto and from a boat (a substrate holder) 217, by means of a continuous action of the wafer transfer device elevator 125b and the wafer transfer device 125a.

A standby portion 126, which houses the boat 217 and causes it to wait, is configured in a rear area of the transfer room 124. A processing furnace 202 is provided above the standby portion 126. A lower extremity of the processing furnace 202 is configured in such a way as to be opened and closed by a furnace aperture shutter (a furnace aperture opening and closing mechanism) 147.

As schematically shown in FIG. 4, a boat elevator (a substrate holder raising and lowering mechanism) 115, for raising and lowering the boat 217, is installed between the pressure-proof cabinet 111 right side extremity and a right extremity of the standby portion 126 of the sub-cabinet 119. A sealing cap 219 being horizontally fixed, as a cover, to an arm 128, which acts as a coupler coupled to an up-down platform of the boat elevator 115, the sealing cap 219 is configured in such a way as to vertically support the boat 217, and be capable of blocking the lower extremity of the processing furnace 202. The boat 217, including a plurality of holding members, is configured in such a way as to horizontally hold each of a plurality (for example, around 50 to 125) of the wafers, in a condition in which they are arranged in a vertical direction with their centers aligned.

As schematically shown in FIG. 4, a cleaning unit 134 configured of a supply fan and an anti-dust filter in such a way as to supply clean air 133, which is a cleaned atmosphere or an inert gas ($N_2$ gas), is installed on a left side extremity of the transfer room 124, which is a side opposite to the wafer transfer device elevator 125b side and the boat elevator 115 side. Although not shown, a notch alignment device 135 is installed between the wafer transfer device 125a and the cleaning unit 134, as a substrate alignment device which aligns circumferential positions of the wafers.

The clean air 133 blown out from the cleaning unit 134 is configured in such a way that, after being distributed around the notch alignment device 135 as well as the wafer transfer device 125a, and the boat 217 in the standby portion 126, it is sucked in by an unshown duct and either ejected to the outside of the cabinet 111, or circulated as far as a primary side (a supply side), which is a suction side of the cleaning unit 134, and again blown out by the cleaning unit 134 into the transfer room 124.

Figure 6:
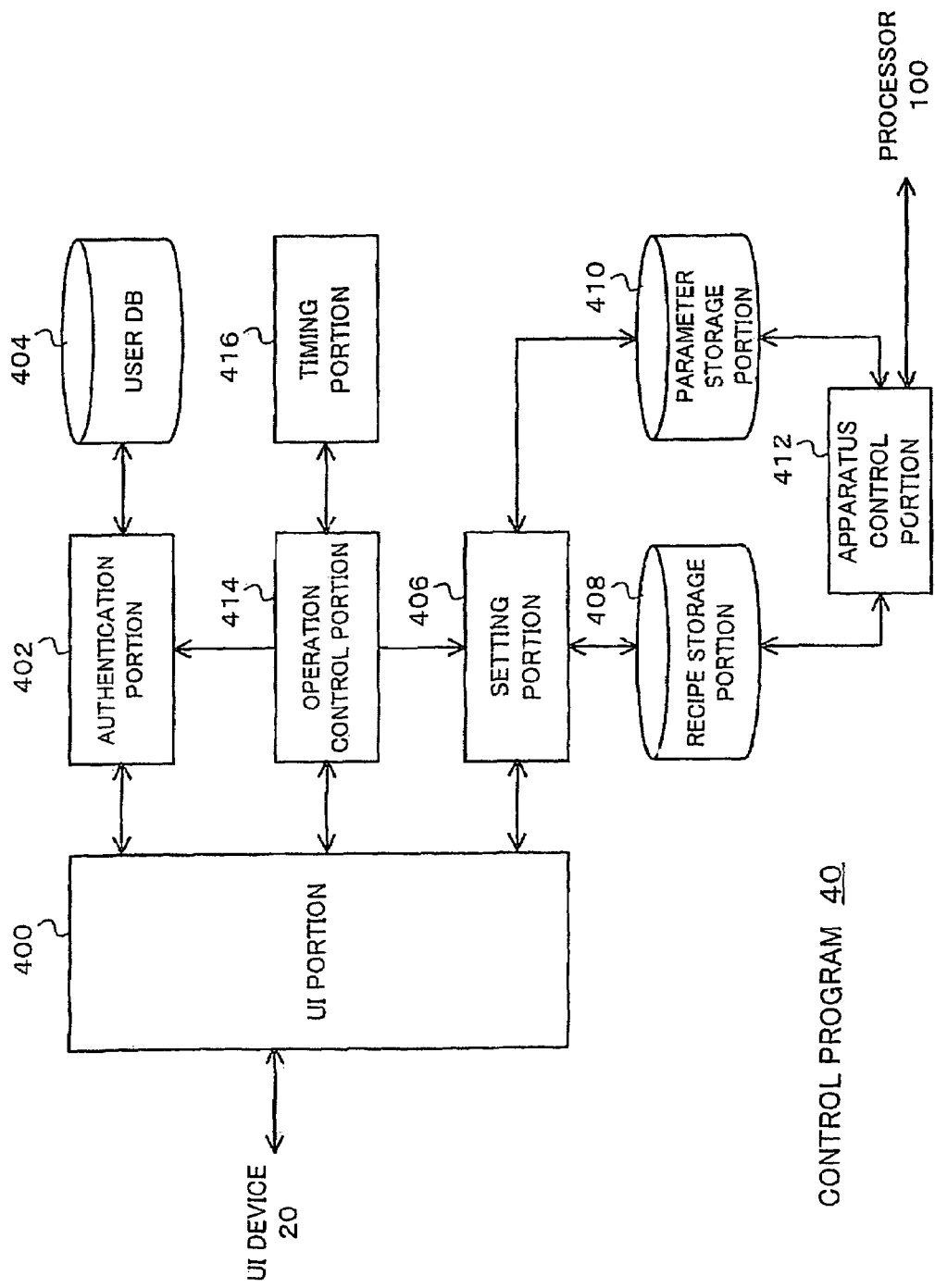
FIG. 6 is a diagram showing a functional configuration of a control program 40 executed by the controller 12 of the substrate processing apparatus 10 according to the embodiment of the invention.

FIG. 6 is a diagram showing a functional configuration of the control program 40 executed by the controller 12 of the substrate processing apparatus 10 according to the embodiment of the invention.

As shown in FIG. 6, the control program 40 has a user interface (UI) portion 400, an authentication portion 402, a user DB 404, a setting portion 406, a recipe storage portion 408, a parameter storage portion 410, an apparatus control portion 412, an operation control portion 414, and a timing portion 416. The control program 40 is, for example, supplied to the substrate processing apparatus 10 stored on a recording medium 24 (FIG. 3) such as an FD, a CD or a DVD, loaded into the memory 16, and executed, specifically using hardware, on an unshown OS which operates on the controller 12. It is also acceptable that the control program 40 is supplied to the controller 12, via the communication device 18, from the external computer which is connected to the unshown network.

In the control program 40, the UI portion 400 receives an operation by the user of the UI device 20, and transmits it to each component of the control program 40. Furthermore, the UI portion 400 displays information and data compiled by each component of the control program 40, as well as process contents and the like of each component, on the display device of the UI device 20.

The user DB 404 stores the user's identifier (ID), the user's password, and the user's authority with respect to each process, such as the recipe editing process and the parameter editing process. The ID is an identifier for uniquely identifying the user. The password is a character series of a prescribed length for authenticating the user which includes, for example, alphanumeric characters. The authority is, for example, one of an "editing" authority, for referring to and editing the setting values, a "reference" authority, for referring to the setting values, or a "prohibited" authority, with which it is possible to carry out neither the reference nor the editing. The user is set one of the authorities for each process. The user DB 404 is realized by at least one of the memory 16 or the storage device 22.

The authentication portion 402 receives the ID and password input on the authentication screen, refers to the user DB 404, and authenticates the user. Specifically, the authentication portion 402, on receiving the ID and password, determines whether or not the password is a correct one for the ID. Furthermore, the authentication portion 402, referring to the user's authority with respect to the process selected on the menu screen, determines whether or not the user has the authority for the process. In the event that it is determined that the password is the correct one for the ID, and that the user can carry out the selected process, the authentication portion 402 permits the execution of the selected process.

The recipe storage portion 408 stores the operation recipe in which are contained process contents of a plurality of processes. The parameter storage portion 410 stores the parameters for controlling the processor 100. Specifically, the parameter storage portion 410 stores the apparatus parameters for changing the condition of the processor 100, the usable functions, and the like. In this way, the recipe storage portion 408 and the parameter storage portion 410 configure a data storage device which stores the data relating to the functions of the processor 100. The recipe storage portion 408 and the parameter storage portion 410, in the same way as the user DB 404, are realized by the storage device 22 and the like.

The setting portion 406 configures an editing operation receiver which receives operations for editing the data stored by the recipe storage portion 408 or the parameter storage portion 410. Specifically, the setting portion 406 receives the operations input by the user via the recipe editing screen (FIG. 2A) or the parameter editing screen (FIG. 2B), and carries out a registration, deletion and update of the operation recipe stored in the recipe storage portion 408, and of the apparatus parameters stored in the parameter storage portion 410.

The apparatus control portion 412, based on the operation recipe stored in the recipe storage portion 408, and the apparatus parameters stored in the parameter storage portion 410, transmits instructions relating to the processing of the substrate to the processor 100, and controls the processor 100.

The timing portion 416 measures the time between the operations received by the setting portion 406. Specifically, in the timing portion 416, in the event that the setting portion 406 has received the operation by the user, the timed value is initialized by the operation control portion 414. Furthermore, the timing portion 416 measures the time at prescribed intervals, and transmits the measurement values to the operation control portion 414.

The operation control portion 414, in the event that the time measured by the timing portion 416 exceeds the prescribed time, configures a prohibitor which prohibits the reception of the operations for editing the data. More specifically, the operation control portion 414, on receiving the operations for editing the data, on the screens which edit the data relating to the functions of the substrate processing apparatus, such as the recipe editing screen and the parameter editing screen, initializes the time measured by the timing portion 416. The operation control portion 414 receives the time measured by the timing portion 416, and determines whether or not the time has exceeded the prescribed time. In the event that the time has exceeded the prescribed time, the operation control portion 414 prohibits the reception of the operations.

For example, the operation control portion 414, controlling the authentication portion 402, forces the user in the process of operating to log out, and displays an initial screen such as the menu screen, or the authentication screen, on the UI device 20. Also, for example, the operation control portion 414, in the event that it receives the operation after the prescribed time has elapsed without the operation being received, controlling the authentication portion 402, causes the authentication screen to be displayed, and causes the input of the ID and the password.

Next, a description will be given of a control process of the substrate processing apparatus 10 according to the embodiment of the invention.

Figure 7:
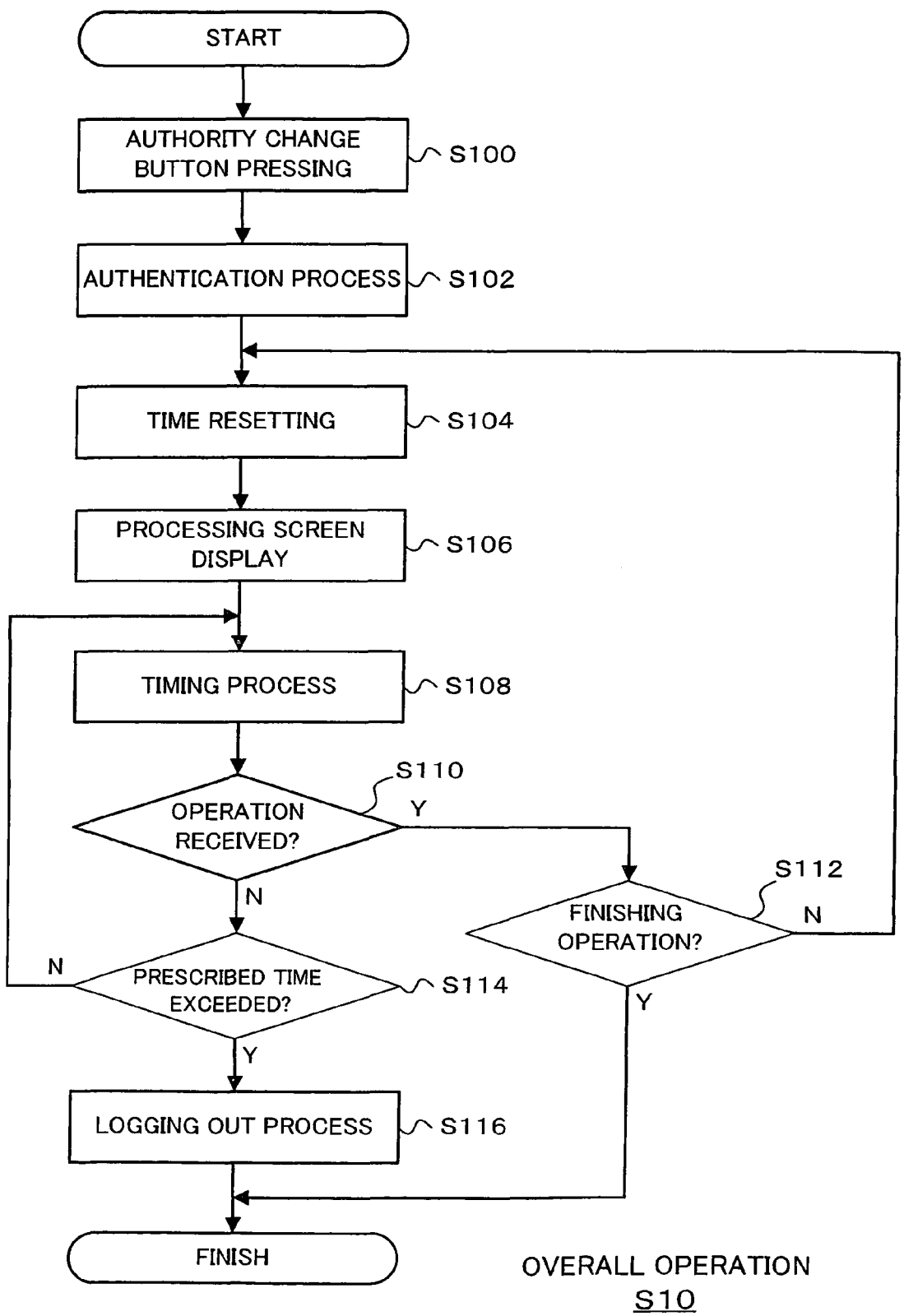
FIG. 7 is a flowchart showing a control process (S10), on the editing screens, of the substrate processing apparatus 10 according to the embodiment of the invention.

FIG. 7 is a flowchart showing a control process (S10), on the editing screens, of the substrate processing apparatus 10 according to the embodiment of the invention.

As shown in FIG. 7, in step 100 (S100), the operation control portion 414 of the control program 40 displays the menu screen (FIG. 1A) on the UI device 20. The operation control portion 414 determines whether or not the authority change button has been pressed, and whether or not any of the menus has been selected by the user, proceeding to a process of S102 if the authority change button has been selected, and returning to the process of S100 if it has not.

In step 102 (S102), the authentication portion 402, being controlled by the operation control portion 414, displays the authentication screen (FIG. 1B) on the UI device 20, receives the ID and password input via the authentication screen, and carries out the authentication process. Specifically, the authentication portion 402, referring to the user DB 404, confirms whether the password is the correct one for the ID, and whether the user has the authority to carry out the selected process. Subsequently, a menu screen corresponding to the user's authority (FIG. 1A) is displayed. On this menu screen, the usable function is displayed in a different color.

In step 104 (S104), the operation control portion 414 initializes the time measured by the timing portion 416. For example, the measured time is made zero.

In step 106 (S106), on the user selecting (pressing) a usable function on the menu screen, the setting portion 406, being controlled by the operation control portion 414, displays the editing screen (FIGS. 2A, 2B etc.) on the UI device 20. The user carries out a prescribed process via the displayed screen.

The setting of the desired control parameters is carried out in FIG. 2A, and the setting of the desired apparatus parameters in FIG. 2B.

In step 108 (S108), the timing portion 416, on being notified by the operation control portion 414 of an operation accompanying the heretofore described settings, carries out the timing process, and transmits the time measured after receiving the operation to the operation control portion 414. Herein, the timing portion 416 adds a prescribed time (for example, one second) to the measured time, and transmits a value after adding.

In step 110 (S110), the setting portion 406 determines whether or not the operation by the user has been received. The control program 40 proceeds to a process of S112 if the operation has been received, and proceeds to a process of S114 if it has not.

In step 112 (S112), the setting portion 406 determines whether or not the operation received is a finishing operation (for example, the operation in which the "save and finish" button has been pressed). If the operation received is the finishing operation, the control program 40 finishes the processing. If this is not the case, the setting portion 406, based on the operation received, carries out a reference to, and an update and the like of, the data stored in the recipe storage portion 408, the parameter storage portion 410 etc., and the control program 40 returns to the process of S104.

In step 114 (S114), the operation control portion 414 determines whether or not the measured time (that is, the time transmitted from the timing portion 416) has exceeded the predetermined prescribed time. The operation control portion 414 proceeds to a process of S116 if the measured time has exceeded the prescribed time, and returns to the process of S108 if it has not.

In step 116 (S116), the operation control portion 414, controlling the authentication portion 402, mandatorily carries out the logging out process. After the logging out process has been executed, the operation control portion 414 displays the initial screen (for example, the menu screen) on the UI device 20.

As the recipe edited up to the logging out depends on a method of using the edited data, the user's needs, and the like, in the event that the logging out is done partway through the editing, in order to provide the versatility, it is desirable to arrange in such a way that the relevant recipe can be selected in such a way that it is unimportant whether the data are deleted or saved.

In the event that the initial screen is displayed, as in the embodiment, the operation control portion 414 returns the edited recipe to the recipe before the editing, while the edited data are destroyed by the authentication portion 406. By so doing, it is possible to prevent the recipe partway through the editing from being mistakenly executed by another user.

Also, although not shown, it is also possible for the operation control portion 414 to temporarily save the edited data in a storage portion for storing the buffer file (the temporary file). In this case, it is possible for another user to edit and execute the original recipe of the recipe partway through the editing.

After the initial screen has been displayed, in the event that a continuation of the editing operation is carried out again, the user, pressing the authority change button on the initial screen, carries out the logging in. Then, the user selects the recipe editing on the menu screen, and carries out the editing operation. By temporarily saving the edited data, as it is possible, when logging in, to cause the operation control portion 414 to control the authentication portion 406 in such a way as to update the original recipe, there being no necessity to reset from a beginning when implementing the editing operation again, it is convenient.

Furthermore, it is also acceptable to display the authentication screen. After it is displayed, in order to carry out the continuation of the editing operation again, the logging in is carried out. Even in the event of saving the data up to partway through the editing, the authentication portion 402 is controlled only when the user who has been doing the editing has logged in again. By so doing, the recipe partway through the editing is prevented from being edited by another user. Also, the recipe partway through the editing is returned to the recipe before the editing, and the edited data is temporarily saved in the unshown temporary file. Then, it is also acceptable, arranging in such a way that, when logging in, the operation control portion 414 causes the authentication portion 406 to select whether to use the original recipe or to update the original recipe, to arrange in such a way as to receive the logging in of another user.

In this way, the operation recipe stored in the recipe storage portion 408, and the apparatus parameters stored in the parameter storage portion 410, are prevented from being edited by the user with no authority. Also, it does not happen that the recipe partway through the editing is mistakenly executed. Consequently, it is possible to prevent the reduction in the product quality, and the damage to the apparatus, due to the user with no operating authority carrying out the editing of the operation recipe, the apparatus parameters, or the like.

In the embodiment, the logging out process is carried out in accordance with the time between the input operations by the user. However, despite the embodiment, a variety of changes are possible, such as, for example, when using a kind of article such as an IC tag which is capable of data transmission at a distance from an operating screen (an ID tag or the like) or without contact, whether or not the IC tag can be read.

Next, a detailed description will be given, referring to FIGS. 4 and 5, of an operation of the processor 100, which is controlled based on the operation recipe, the apparatus parameters, and the like. This kind of operation is controlled by the apparatus control portion 412 of the control program 40.

As shown in FIGS. 4 and 5, on the pods 110 being supplied to the load port 114, the pod in-out aperture 112 is opened by the front shutter 113, and the pods 110 on the load port 114 are brought into the inside of the cabinet 111, through the pod in-out aperture 112, by the pod conveyor device 118.

Each of the pods 110 brought in is automatically conveyed, by the pod conveyor device 118, to a designated shelf plate 117 of the rotating pod shelves 105, transferred and, after being temporarily stored, conveyed from the shelf plate 117 to one pod opener 121 and transferred to the mounting platform 122, or alternatively, conveyed directly to the pod opener 121 and transferred to the mounting platform 122. At this time, the wafer in-out apertures 120 of the pod openers 121 being closed by the cap attachment and removal mechanisms 123, the clean air 133 is circulated in the transfer room 124, and it is filled. For example, by nitrogen gas filling the transfer room 124, as the clean air 133, an oxygen concentration, at 20 ppm or less, is set considerably lower than an oxygen concentration of the inside of the cabinet 111 (a room atmosphere).

The pod 110 mounted on the mounting platform 122, as well as its opening side end face being pressed against an opening rim portion of the wafer in-out aperture 120 in the front wall 119a of the sub-cabinet 119, its cap is removed by the cap attachment and removal mechanism 123, and the wafer in-out aperture is opened. On the pod 110 being opened by the pod opener 121, the wafers are picked out from the pod 110, through the wafer in-out aperture, by the tweezers 125c of the wafer transfer device 125a and, after the wafers are aligned with the notch alignment device 135, they are brought into the standby portion 126 in the rear of the transfer room 124, and loaded (charged) on the boat 217. The wafer transfer device 125a which has transferred the wafers to the boat 217 returns to the pod 110, and loads the next wafers on the boat 217.

During the loading operation of the wafers onto the boat 217 by the wafer transfer device 125 in the one (top or bottom) pod opener 121, a separate pod 110 is conveyed from the rotating pod shelves 105 by the pod conveying device 118, and transferred to the other (bottom or top) pod opener 121, and the opening operation of the pod 110 by the pod opener 121 is done concurrently.

On a number of wafers, designated in advance, being loaded on the boat 217, the lower extremity of the processing furnace 202, which had been closed by the furnace aperture shutter 147, is opened by the furnace aperture shutter 147. Continuing on, the boat 217, which holds the collection of wafers, is brought (loaded) into an inside of the processing furnace 202 by the sealing cap 219 being raised by the boat elevator 115.

After the loading, an optional process is implemented on the wafers in the processing furnace 202. After the processing, the wafers and the pods 110 are ejected to the outside of the cabinet 111 by a procedure largely the reverse of the one heretofore described, omitting the wafer alignment process by the notch alignment device 135.

The substrate processing apparatus according to the embodiment can be applied not only to the vertical apparatus, but also to the single wafer apparatus, a horizontal apparatus, an LCD device, or the like. Also, it can also be applied to a collective management apparatus which centrally controls a plurality of the substrate processing apparatus. In particular, in a case in which an operator handles the collective management apparatus, as the operator has an authority to manage the system, an advantage of the invention is noticeable. Furthermore, the substrate processing apparatus according to the invention, not being limited to the processing inside the furnace, can also carry out processes which form a CVD, a PVD, the oxide film, or a nitride film, and film forming processes including a process which forms a film including a metal.

What is claimed is:

1. A substrate processing apparatus which, executing a compiled or edited recipe, processes a substrate, the apparatus comprising:
    a display device which displays an editing screen for compiling or editing the recipe by setting at least one control parameter among control parameters containing a pressure and a processing gas flow; and
    a controller that has at least a recipe storage portion for storing the recipe, a parameter storage portion for storing the control parameters, and an operation control portion, wherein the operation control portion carries out the following processes, when a time set in advance elapses without an operation being carried out on the editing screen displayed by the display device in an event of setting at least the control parameter, compiling or editing the recipe: (1) a process that switches from the editing screen to a prescribed screen which differs from the editing screen, (2) a process that deletes the recipe partway through the editing that is compiled or edited by the operation by the time set in advance, and saves the control parameter that is set by the time set in advance, while returning to an original recipe before the compiling or the editing, when a save and finish button displayed on the editing screen is pressed by the time set in advance, (3) a process that switches to the prescribed screen, and (4) a process that saves the recipe partway through the editing, wherein
    the controller, as well as switching from the editing screen to the prescribed screen, carries out a logging out process, and
    the controller switches from the editing screen to an initial screen that includes designation devices for carrying out a change of an operating authority and a logging in process.

2. The substrate processing apparatus according to claim 1, wherein
    the controller switches from the editing screen to an authentication screen for carrying out a logging in process.

3. The substrate processing apparatus according to claim 2, wherein
    the controller receives a recipe editing operation when an identifier and a password of a user input via the authentication screen match an identifier and a password of the user stored in advance.

4. The substrate processing apparatus according to claim 1, wherein
    the controller carries out the screen switching process that switches to the prescribed screen upon pressing of a display switch button displayed on the editing screen.

5. A recipe editing method performed on a substrate processing apparatus comprising the steps of:
    displaying an editing screen for compiling or editing the recipe on the apparatus by setting at least one control parameter among control parameters containing a pressure and a processing gas flow;
    controlling the apparatus to carry out the following processes when a time set in advance elapses without an operation being carried out on the displayed editing screen in an event of setting at least the control parameter, compiling or editing the recipe: (1) a process that switches from the editing screen to a prescribed screen which differs from the editing screen, deletes the recipe partway through the editing that is compiled or edited by the operation by the time set in advance, and saves the control parameter that is set by the operation by the time set in advance, while returning to an original recipe before the compiling or the editing, when a save and finish button displayed on the editing screen is pressed by the time set in advance, (2) a process that switches to an initial screen, and (3) a process that saves the recipe partway through the editing;
    switching from the editing screen to the prescribed screen and carrying out a logging out process; and
    switching from the editing screen to an initial screen that includes designation devices for carrying out a change of an operating authority and a logging in process.

6. The recipe editing method according to claim 5, wherein in the step of controlling,
    a recipe editing operation is received when the change of the operating authority and the logging in process are carried out via the designation devices.

7. The recipe editing method according to claim 5, wherein in the step of controlling,
    the screen switches from the editing screen to an authentication screen and receives a recipe editing operation on the editing screen when an identifier and a password of a user input via the authentication screen match an identifier and a password of the user stored in advance.

8. A method for manufacturing a semiconductor device comprising the steps of:
- displaying an editing screen for compiling or editing a recipe on the device by setting at least one control parameter among control parameters containing a pressure and a processing gas flow;
- carrying out the following processes when a time set in advance elapses without an operation being carried out on the displayed editing screen in an event of setting at least the control parameter, compiling or editing the recipe: (1) a process that switches from the editing screen to an initial screen that includes designation devices for carrying out a change of an operating authority and a logging in process; deletes the recipe partway through the editing that is compiled or edited by the operation by the time set in advance, and saves the control parameter that is set by the operation by the time set in advance, while returning to an original recipe before the compiling or the editing, when a save and finish button displayed on the editing screen is pressed by the time set in advance, (2) a process that switches to the initial screen, and (3) a process that saves the recipe partway through the editing when the logging in process is carried out via the designation devices on the initial screen; and (4) a process that processes a substrate by carrying out the original recipe before compiling or editing, or processes the substrate by carrying out the saving recipe partway through the editing, or processes the substrate by carrying out the recipe partway through the editing that inputted the saving control parameter to the original recipe;
- switching from the editing screen to the prescribed screen and carrying out a logging out process; and
- switching from the editing screen to an initial screen that includes designation devices for carrying out a change of an operating authority and a logging in process.

\* \* \* \* \*